Patented May 19, 1942

2,283,518

UNITED STATES PATENT OFFICE 2,283,518

PIGMENTED OIL GEL AND METHOD OF MAKING

William A. Waldie, Dayton, Ohio, assignor to The Commonwealth Engineering Company of Ohio, Dayton, Ohio, a corporation of Ohio No Drawing. Application October 17, 1940, Serial No. 361,612

29 Claims. (Cl. 106—244)

This invention relates to a pigmented oil product useful in the compounding of paints, enamels, lacquers, inks, plastics, rubber, linoleum and cement.

It is an object of this invention to produce a pigmented oil product wherein the pigment is uniformly dispersed throughout the oil to provide a smooth paste without grinding the pigment in the oil to effect the dispersion, such as has been the practice heretofore.

Another object of this invention is to devise a method for making pigmented oil paste utilizing the pigments commonly available on the market and used in the making of paints, plastics and the like wherein the pigment is uniformly dispersed in the oil during the chemical treatment of the oil.

Another object is to devise a method of dispersing dry pigment in an oil to form a smooth paste wherein the oil is first saponified and the pigment introduced into the saponified oil mixture, acidified and esterified to produce a glyceride reaction product in which the pigment particles are thoroughly dispersed without requiring milling or grinding of the pigment to effect dispersion of the particles.

Another object is to produce a pigment-oil paste composition having a sufficiently high concentration of dispersed pigment so that the product can be utilized in formulating paints, enamels and similar coating compositions by incorporating suitable amounts of the pigment-oil paste with oleoresinous components and thinning with solvent in the usual manner of making paints and enamels.

Another object is to provide a pigmented oil product which is adapted for use in making printing inks and the like wherein the pigment is incorporated in the oil by saponifying the same and subsequently esterifying the saponified oil to produce a synthesized glyceride oil vehicle in which the pigment particles are thoroughly dispersed.

These and other objects and advantages will appear hereinafter in light of the description.

Broadly, the process of this invention comprises the preparation of a pigment-oil paste product without grinding the pigment in the oil to disperse the particles. To this end, the oil is first saponified and the pigment added and then the mixture is rendered slightly acid by the addition of weak acid solution which precipitates the pigment and fatty acid of the oil and whereupon the water separates. The water is then decanted or otherwise separated from the precipitate and then the pigmented mass is reacted with glycerin to form the mono, di, or tri glycerides of the fatty acid components of the saponified oil or mixtures thereof. The oil used as the initial constituent may be of the drying, semidrying or nondrying type depending upon the particular pigmented oil product desired.

As typical examples of the method of preparing the pigmented oil dispersion products of this invention, the following are given:

Example I

| | | |
|---|---|---|
| Linseed oil | lbs | 22.0 |
| White lead | lbs | 246.0 |
| Caustic soda | lbs | 3.3 |
| Glycerin | lbs | 2.2 |
| Acetic anhydride | pts | 5.5 |
| Water | gals | 76.5 |

In compounding the above ingredients, the linseed oil is saponified by stirring in the caustic soda dissolved in about two-thirds of the water and boiling the mixture for approximately ten minutes at 212 degrees F. or somewhat above.

To the saponified mixture is added the white lead pigment which is in the form of an aqueous suspension comprising the remainder of the water. The pigment and saponified oil mixture is then boiled for approximately one hour and thereafter the acetic anhydride or equivalent weak acid is added while stirring until the mixture is slightly acid to litmus. A precipitate is formed comprising pigment and fatty acid oil components and the water separates out which is decanted or drained off and discarded. The glycerin is then introduced into the batch and the mixture heated to approximately 260 to 275 degrees F. for about one and one-half hours to esterify the fatty acid oil components and produce the mono, di and tri glycerides of the fatty acids.

The resultant product is a smooth, white lead, oily paste which can be incorporated in paints, enamels, plastics, etc. and of similar consistency as white lead oil paste made by grinding the pigment in linseed oil.

Example II

| | | |
|---|---|---|
| Linseed oil | lbs | 22.0 |
| Zinc oxide | lbs | 44.0 |
| Caustic soda | lbs | 3.3 |
| Glycerin | lbs | 2.2 |
| Water | gals | 27.5 |
| Acetic anhydride | pts | 5.5 |

In compounding the ingredients, about half of the water into which the caustic soda has been dissolved is mixed with the linseed oil and the oil is saponified by boiling this mixture for about ten minutes as in Example I. Thereafter a water slurry of the zinc oxide in the remainder of the water is stirred into the saponified oil mixture and the batch is then boiled for approximately an hour. Acetic anhydride is then stirred into the mixture until the batch is slightly acid to litmus.

Upon acidifying the batch the fatty oil and pigment are precipitated as a pasty mass from which the water separates and is drawn off and discarded. The glycerin is then added to the pigment-fatty acid precipitate and the mixture heated to approximately 260 to 275 degrees F. for one and one-half hours to esterify the fatty oil components producing mono, di, tri glycerides of the fatty acids.

The resultant product is a smooth zinc oxide-oil paste ready for use without grinding in the formulation of paints, enamels, plastics, etc.

*Example III*

| | | |
|---|---|---|
| Linseed oil | lbs | 22.0 |
| Lithopone | lbs | 40.0 |
| Caustic soda | lbs | 3.3 |
| Water | gals | 30.0 |
| Glycerin | lbs | 2.3 |
| Acetic anhydride | pts | 6.0 |

The linseed oil is saponified by adding the caustic soda in water solution, as in Example II, utilizing about two-thirds of the water content. This mixture is then boiled for about fifteen minutes to saponify the oil. Thereafter the lithopone is incorporated in an aqueous suspension with the remainder of the water and the resultant batch is boiled for approximately an hour. To this reaction mixture there is then stirred in the acetic anhydride until the mixture becomes slightly acid and the pigment and fatty acid oil components are precipitated. The water which separates out from the mass is decanted and discarded. After draining off the water from the batch glycerin is added and the mixture heated to approximately 260 to 275 degrees F. for about one and one-half hours until the fatty acid oil constituent is esterified to produce the mono, di and tri glycerides thereof.

The resultant product is a smooth, white paste similar to Example II but comprising lithopone instead of zinc oxide.

*Example IV*

| | | |
|---|---|---|
| Linseed oil | lbs | 22.0 |
| Carbon black | lbs | 5.5 |
| Caustic soda | lbs | 3.3 |
| Glycerin | lbs | 2.2 |
| Water | gals | 75.0 |

The linseed oil and about two-thirds of the water are mixed together and the caustic soda which has been dissolved in a portion of the water admixed therewith. This mixture is boiled for approximately ten to fifteen minutes to saponify the oil. Thereafter, the carbon black is incorporated as an aqueous suspension in the remainder of the water and this mixture is boiled for approximately an hour with intermittent stirring. To the resultant reaction mixture is incorporated a weak solution of hydrochloric acid (i. e., 0.1 N HCl) until the mass is slightly acid to litmus.

Upon acidifying the mass, a carbon black-fatty acid precipitate is formed from which the water separates. The water is drawn off and the glycerin is added to the carbon black-fatty acid paste and the mixture heated for one and one-half hours at approximately 260 to 275 degrees F. to esterify the fatty acid oil components to produce mono, di and tri glycerides.

This produces a homogeneous smooth black paste wherein the carbon black particles are thoroughly dispersed in the glyceride oil vehicle. The product is ready for use as a carbon black-oil paste in the conventional manner.

In the examples linseed oil has been used as the typical drying oil. However, as mentioned heretofore, other drying, semidrying and non-drying oils, such as China-wood oil, Perilla, soy bean, cottonseed and fish oil may be used in place of linseed oil. Various other pigments in place of those mentioned may be used in compounding the pigment-oil paste, such as titanium oxide, whiting, iron oxide, lamp black, etc., so long as the heat treatment is not injurious to the pigment or substantially alters its color value.

In place of caustic soda, it will be understood that other alkali metal hydroxides, such as potassium, can be used to saponify the oil. Ammonium hydroxide also can be used.

In place of glycerin other polyhydric alcohols, such as the glycols, and higher polyhydric alcohols, such as sorbitol, mannitol and pentahydric, can be used.

Other weak organic and inorganic acids may be utilized in place of acetic and hydrochloric acids, such as citric, formic, propionic, or other acid anhydrides.

The essential steps in the process, which produce the unexpectedly high dispersion of the pigment without milling or grinding, are the formation of a soap which functions as a wetting and dispersing agent for the pigment and the subsequent esterification of the fatty acid reaction product in situ while the pigment particles are thoroughly dispersed whereupon a smooth paste is produced.

Further, it will be understood that composite pigment admixtures as well as mixtures of different oils may be used in making the pigment-oil paste product of this invention.

It will be understood further that this invention is not limited to the particular ingredients set out in the examples and that the process may be varied as required for different ingredients and the uses to which the product is to be put.

Having thus fully described my invention, what I claim as new and desire to secure by Letters Patent is:

1. A method of making a pigmented oil product comprising reacting fatty oil with an alkali to form a soap, mixing pigment in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

2. A method of making a pigmented oil product comprising reacting vegetable drying oil with an alkali to form a soap, mixing pigment in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

3. A method of making a pigmented oil product comprising reacting drying fatty oil with an alkali to form a soap, mixing pigment in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

4. A method of making a pigmented oil product comprising reacting a semi-drying fatty oil with an alkali to form a soap, mixing pigment in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

5. A method of making a pigmented oil product comprising reacting non-drying fatty oil with an alkali to form a soap, mixing pigment in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

6. A method of making a pigmented oil product comprising reacting linseed oil with an alkali to form a soap, mixing pigment in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

7. A method of making a pigmented oil product comprising reacting fatty oil with an alkali to form a soap, mixing a pigment comprising carbon black, in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

8. A method of making a pigmented oil product comprising reacting fatty oil with an alkali to form a soap, mixing a pigment comprising zinc oxide in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

9. A method of making a pigmented oil product comprising reacting fatty oil with an alkali to form a soap, mixing a pigment comprising white lead in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

10. A method of making a pigmented oil product comprising reacting soy bean oil with an alkali to form a soap, mixing pigment in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

11. A method of making a pigmented oil product comprising reacting cotton seed oil with an alkali to form a soap, mixing pigment in the form of an aqueous suspension into said soap to thoroughly coat the particles of the pigment therewith, acidifying the mixture to thereby liberate free fatty acids, removing the water which separates out, adding glycerin, and heating the mixture to esterify the fatty acids to produce the glycerides thereof in which the pigment particles are thoroughly dispersed.

12. A method of making a pigmented oil product comprising reacting fatty oil with an alkali to form a soap, mixing pigment in the form of an aqueous suspension into said soap to thoroughly coat the particles of the pigment therewith, acidifying the mixture with acetic anhydride to thereby liberate free fatty acids, removing the water which separates out, adding glycerin, and heating the mixture to esterify the fatty acids to produce the glycerides thereof in which the pigment particles are thoroughly dispersed.

13. A method of making a pigmented oil product comprising reacting fatty oil with an alkali to form a soap, mixing pigment in the form of an aqueous suspension into said soap to thoroughly coat the particles of the pigment therewith, acidifying the mixture with hydrochloric acid to thereby liberate free fatty acids, removing the water which separates out, adding glycerin, and heating the mixture to esterify the fatty acids to produce the glycerides thereof in which the pigment particles are thoroughly dispersed.

14. A method of making a pigmented oil product comprising reacting fatty oil with an alkali to form a soap, mixing pigment in the form of an aqueous suspension into said soap to thoroughly coat the particles of the pigment therewith, acidifying the mixture with formic acid to thereby liberate free fatty acids, removing the water which separates out, adding glycerin, and heating the mixture to esterify the fatty acids to produce the glycerides thereof in which the pigment particles are thoroughly dispersed.

15. A method of making a pigmented oil product comprising reacting fatty oil with an alkali to form a soap, mixing pigment in the form of an aqueous suspension into said soap to thoroughly coat the particles of the pigment therewith, acidifying the mixture to thereby liberate free fatty acids, removing the water which separates out, adding polyhydric alcohol, and heating the mixture to esterify the fatty acids to produce the glycerides thereof in which the pigment particles are thoroughly dispersed.

16. A method of making a pigmented oil product comprising reacting fatty oil with an alkali to form a soap, mixing pigment in the form of an aqueous suspension into said soap to thoroughly coat the particles of the pigment therewith, acidifying the mixture to thereby liberate free fatty acids, removing the water which separates out, adding polyhydric alcohols of the class consisting of glycerin, glycol, sorbitol, mannitol and pentahydric alcohol, and heating the mixture to esterify the fatty acids to produce the glycerides thereof in which the pigment particles are thoroughly dispersed.

17. A pigmented paste coating composition consisting of pigment dispersed in fatty acid glycerides, said paste being produced by the method of claim 1.

18. A pigmented paste coating composition consisting of pigment dispersed in fatty acid glycerides, said paste being produced by the method of claim 2.

19. A pigmented paste coating composition consisting of pigment dispersed in fatty acid glycerides, said paste being produced by the method of claim 3.

20. A pigmented paste coating composition consisting of pigment dispersed in fatty acid glycerides, said paste being produced by the method of claim 4.

21. A pigmented paste coating composition consisting of pigment dispersed in fatty acid glycerides, said paste being produced by the method of claim 5.

22. A pigmented paste coating composition consisting of pigment dispersed in fatty acid glycerides, said paste being produced by the method of claim 6.

23. A pigmented paste coating composition consisting of pigment dispersed in fatty acid glycerides, said paste being produced by the method of claim 7.

24. A pigmented paste coating composition consisting of pigment dispersed in fatty acid glycerides, said paste being produced by the method of claim 8.

25. A pigmented paste coating composition consisting of pigment dispersed in fatty acid glycerides, said paste being produced by the method of claim 9.

26. A pigmented paste coating composition consisting of pigment dispersed in fatty acid glycerides, said paste being produced by the method of claim 10.

27. A pigmented paste coating composition consisting of pigment dispersed in fatty acid glycerides, said paste being produced by the method of claim 11.

28. A pigmented paste coating composition consisting of pigment dispersed in fatty acid glycerides, said paste being produced by the method of claim 15.

29. A pigmented paste coating composition consisting of pigment dispersed in fatty acid glycerides, said paste being produced by the method of claim 16.

WILLIAM A. WALDIE.